United States Patent [19]
Haas et al.

[11] Patent Number: 5,979,340
[45] Date of Patent: Nov. 9, 1999

[54] POLE INSERTING ROBOTIC MECHANISM FOR ACCESSING THE INTERIOR OF A HARSH ENCLOSURE

[75] Inventors: Carl Thomas Michael Haas; Sidigata Venkataraman Sreenivasan; Alfred Ellis Traver; Kamel Shawki Saidi; Jongwon Seo; Richard Lael Greer, all of Austin, Tex.

[73] Assignee: The Board of Regents of the University of Texas System, Austin, Tex.

[21] Appl. No.: 09/092,362

[22] Filed: Jun. 5, 1998

[51] Int. Cl.[6] ............................................. F23J 1/00
[52] U.S. Cl. ................... 110/165 R; 110/105; 110/185; 110/191; 110/193; 110/233; 414/23; 414/909; 432/75; 901/6
[58] Field of Search .......................... 110/165 R, 101 A, 110/101 C, 105, 185, 191, 193, 233, 349; 414/23, 909, 917; 432/36, 75, 76; 373/166; 266/174, 903; 901/6

[56] References Cited

U.S. PATENT DOCUMENTS

| | | |
|---|---|---|
| 3,834,560 | 9/1974 | Miller . |
| 3,882,802 | 5/1975 | Stewart et al. ............................ 110/191 |
| 3,918,375 | 11/1975 | Hayakawa et al. . |
| 3,990,836 | 11/1976 | Bricmont ................................... 432/75 |
| 4,020,773 | 5/1977 | Blach .................................. 110/165 R |
| 4,102,001 | 7/1978 | Baba et al. ............................ 432/75 X |
| 4,212,583 | 7/1980 | Gebelin ................................ 414/909 X |
| 4,372,227 | 2/1983 | Mahoney et al. ........................ 110/342 |
| 4,456,635 | 6/1984 | Albanese et al. . |
| 4,480,593 | 11/1984 | Robinson ................................. 122/379 |
| 4,514,096 | 4/1985 | Wynnyckyj et al. . |
| 4,759,299 | 7/1988 | Kennedy et al. ........................ 110/193 |
| 4,907,543 | 3/1990 | Matranga et al. .................... 432/75 X |
| 4,919,194 | 4/1990 | Gery et al. . |
| 4,960,379 | 10/1990 | Schneider ............................... 432/75 X |
| 4,976,206 | 12/1990 | Steiner et al. ........................... 110/171 |
| 4,981,088 | 1/1991 | Burris ..................................... 110/193 |
| 5,001,994 | 3/1991 | Morimoto et al. ..................... 110/342 |
| 5,255,615 | 10/1993 | Magaldi ................................. 110/234 |
| 5,484,219 | 1/1996 | Drew et al. . |
| 5,623,582 | 4/1997 | Rosenberg . |
| 5,697,480 | 12/1997 | Herbermann et al. . |

OTHER PUBLICATIONS

Fallon, J. Barry, et al., "Robotics for Challenging Environments", Proceedings of the ASCE Specialty Conference, Albuquerque, New Mexico, Feb. 26–Mar. 3, 1994, pp. 311–319.

Hollerbach, John M., "Optimum Kinematic Design for a Seven Degree of Freedom Manipulator", Robotics Research: The Second International Symposium, 1985, Cambridge, MIT Press, 5 pages.

Lee, Hong–Yu, et al., "Inverse Kinematic Analysis of a Mobile Underwater Inspection Robot", Virginia Polytechnic Institute and State University, 1993, 6 pages.

Park, F. C. "Optimal Robot Design and Differential Geometry", Transactions of the ASME, Jun. 1995, vol. 117, pp. 87–92.

Tidwell, Paul H., et al., "COBRA—Design and Development of a Manipulator for Nuclear Steam Generator Maintenance", 2nd National AMR Conf., Cincinnati, OH, Nov. 3–6, 1992, pp. IVB.1–1–IVB.1–10.

Vijaykumar, R., et al., "Geometric Optimization of Serial Chain Manipulator Structures for Working Volume and Dexterity", The International Journal of Robotics Research, vol. 5, No. 2, Summer 1986, pp. 91–103.

*Primary Examiner*—Ira S. Lazarus
*Assistant Examiner*—Ljiljana V. Ciric
*Attorney, Agent, or Firm*—Flehr Hohback Test Albritton & Herbert LLP

[57] ABSTRACT

A robotic mechanism which can be attached to a furnace hopper and includes a frame which supports a pole insertion mechanism for inserting a pole into a furnace hopper. The pole insertion mechanism is supported from the Fame by a gimbal and moves the pole axially. Hydraulic actuators rotate the pole insertion mechanism about the gimbal. A control system is associated with the mechanism and enables an operator to position the end of the pole within the hopper to remove clinkers.

14 Claims, 7 Drawing Sheets

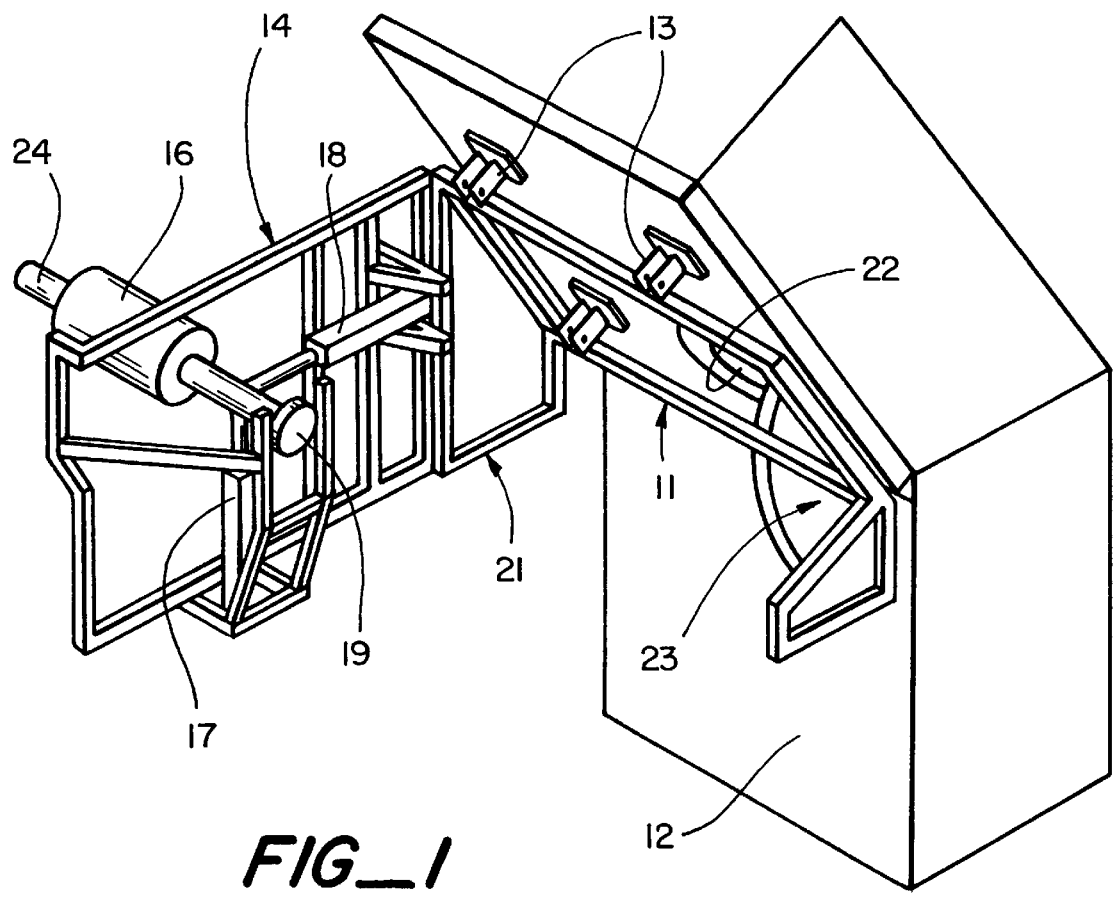
FIG_1
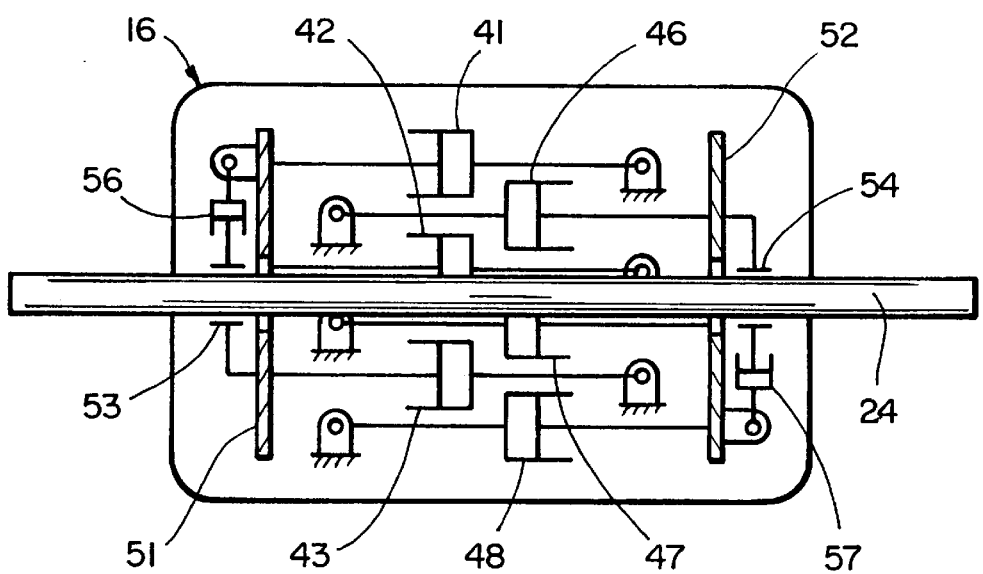
FIG_2

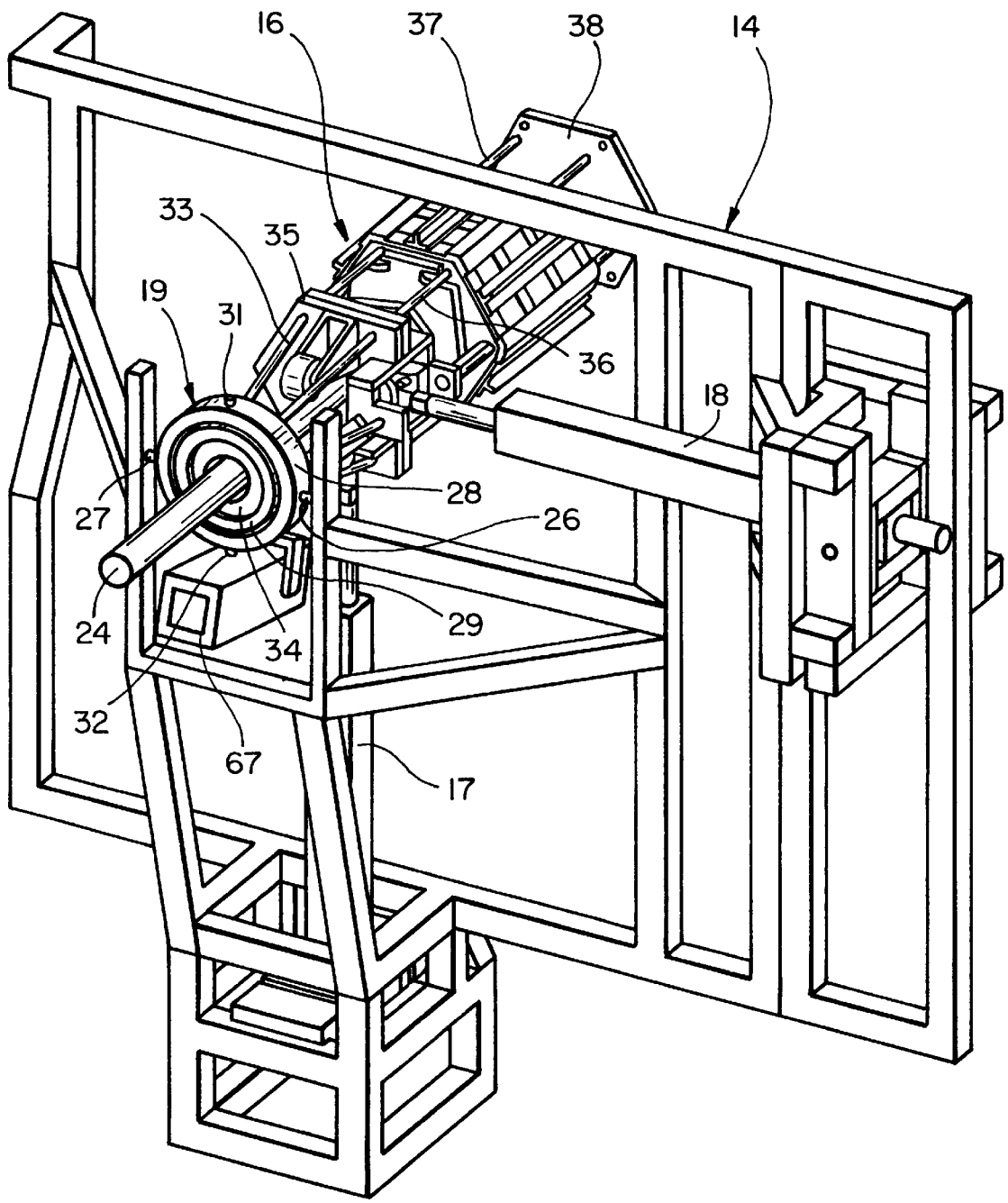
FIG_3

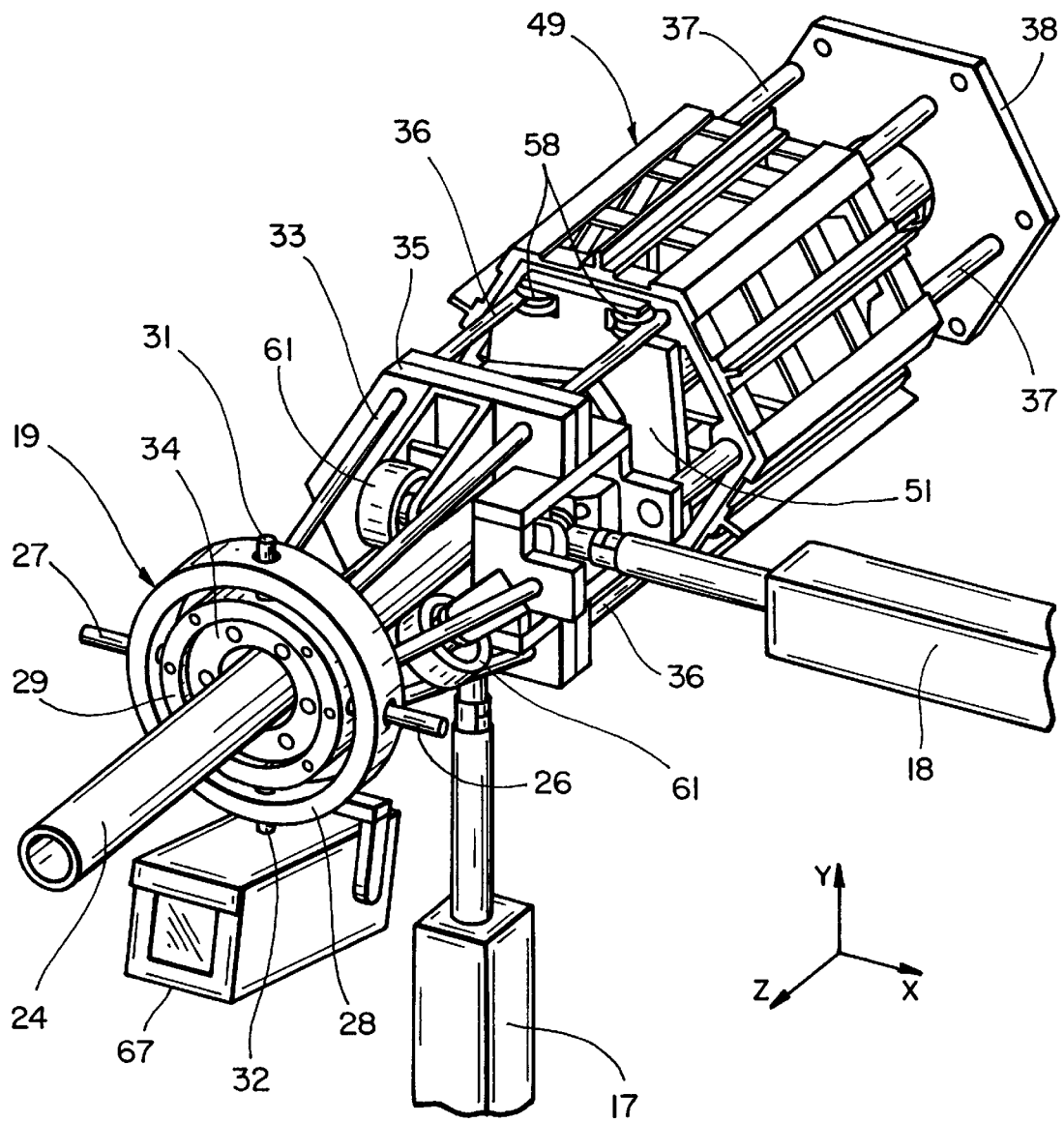
FIG_4

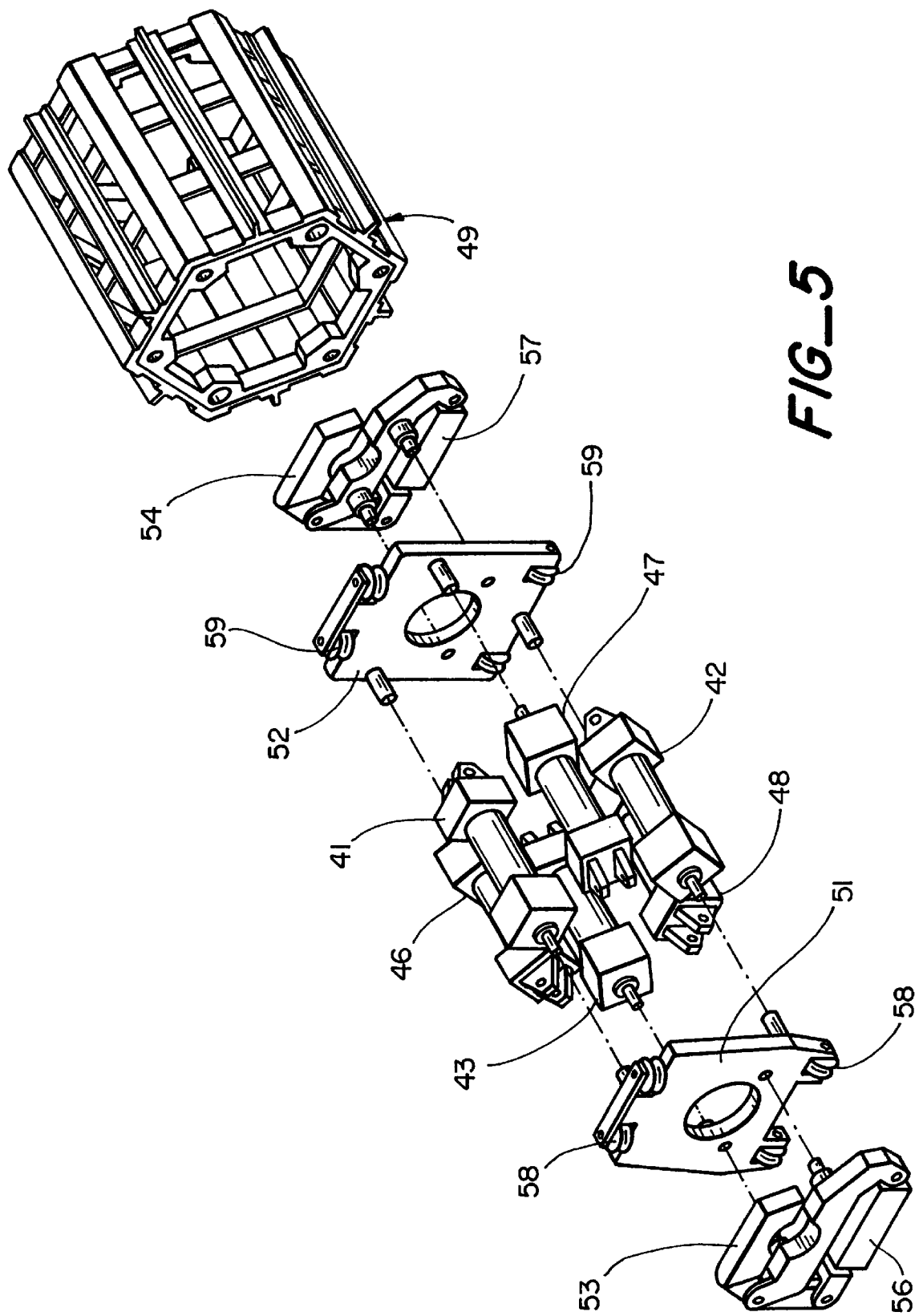
FIG_5

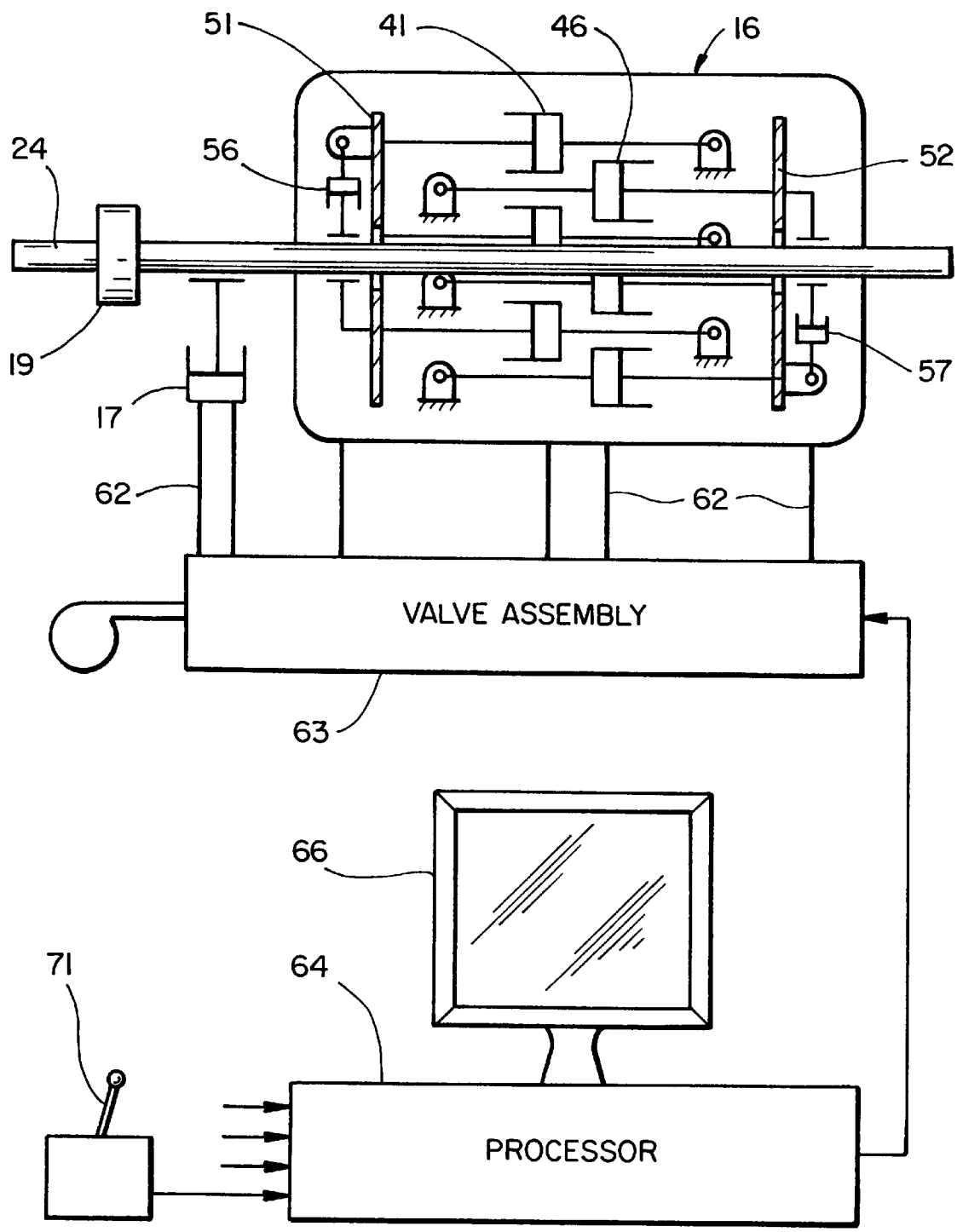
FIG_6

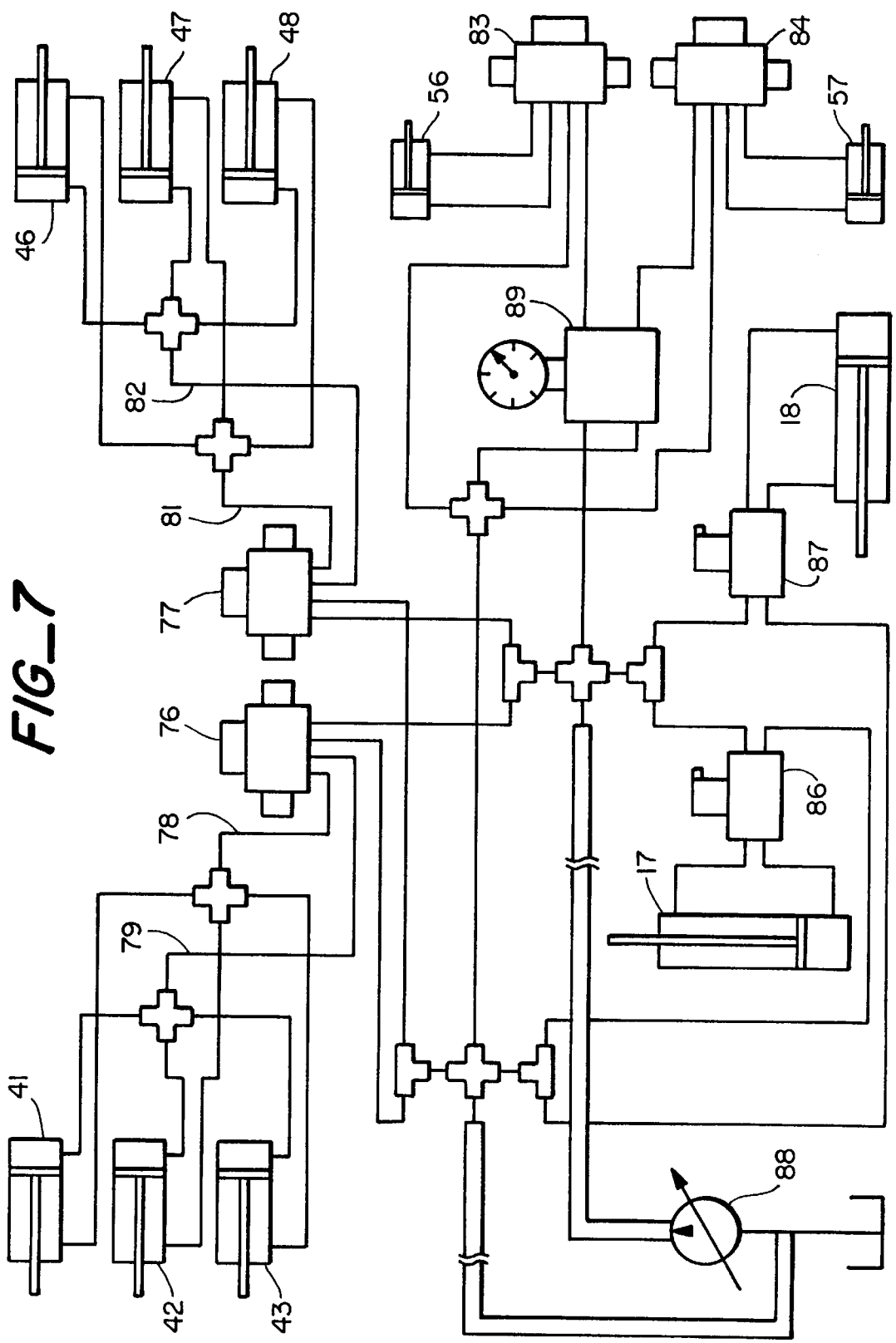
FIG_7

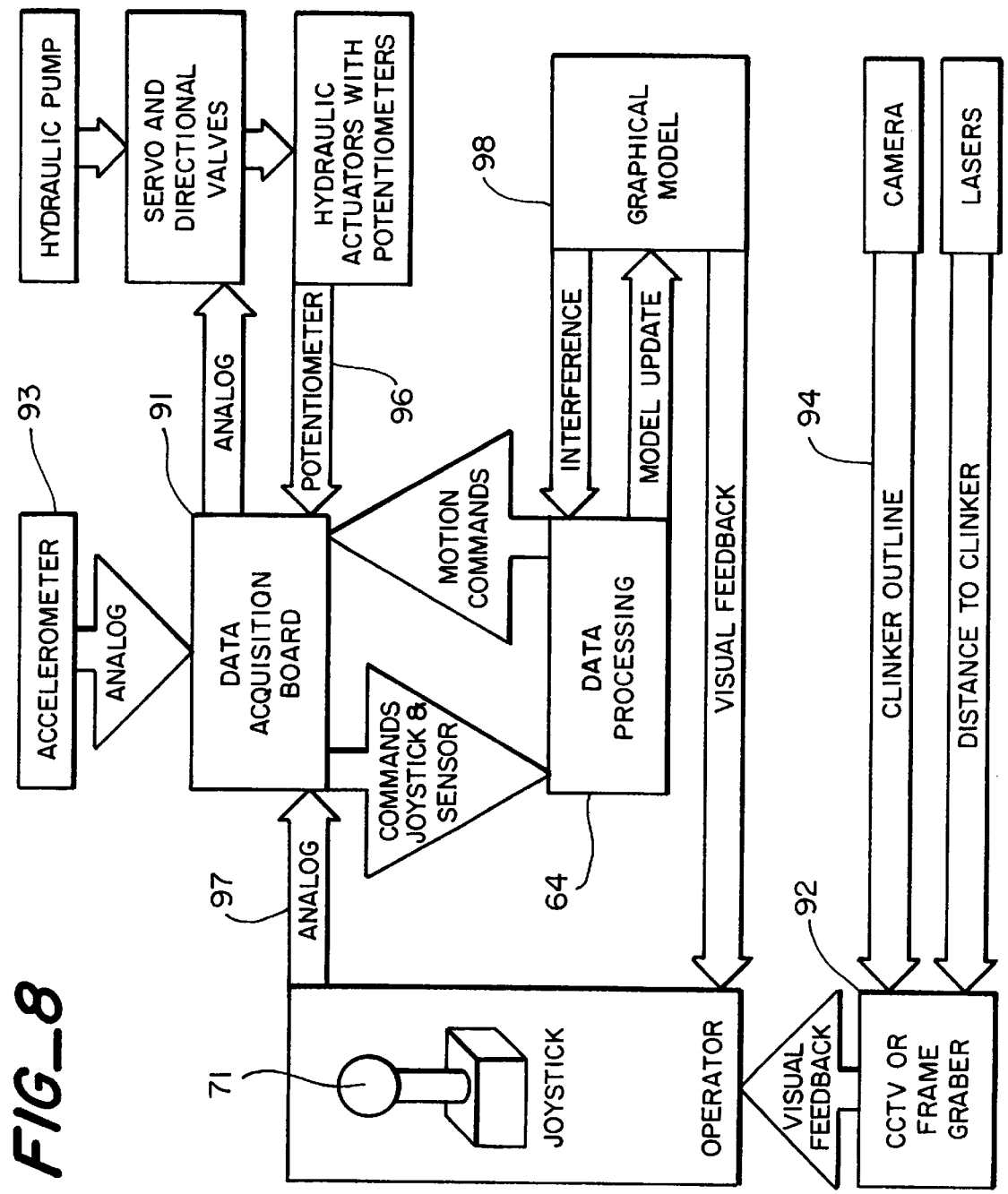

POLE INSERTING ROBOTIC MECHANISM FOR ACCESSING THE INTERIOR OF A HARSH ENCLOSURE

BRIEF DESCRIPTION OF THE INVENTION

A robotic mechanism which consists of an actuated gimbal and a pole insertion mechanism that serves as a prismatic pivot for inserting and extracting a pole into and from a harsh enclosure such as for removal of clinkers in the hopper of a lignite furnace in an electric power facility.

BACKGROUND OF THE INVENTION

Lignite-fired electric power facilities produce a byproduct of the combustion process commonly referred to as clinkers. A clinker is a conglomeration of molten ash which is produced by the burning lignite. The clinkers accumulate along the boiler hopper walls and continuously drop to the bottom into a cooling pool of water. The cooling pool serves to fragment the clinkers and to flush them out of the hopper.

As clinkers build up on the hopper walls, the efficiency of the furnace is reduced due to the poor heat transfer properties of the clinkers. In addition, the clinkers that fall to the bottom of the hopper can hinder the operation of the flushing apparatus or block it completely. In order to circumvent this problem, the hoppers incorporate a grinder in the flushing apparatus which pulverizes the clinkers that are fragmented in the cooling pool. A sluice gate separates the hopper from the grinder and flushing apparatus. This gate is opened to allow the flushing of the hopper contents. However, some clinkers get stuck before they reach the grinder and others are simply too large to be handled by the grinder. In addition, the strength properties of clinkers are anisotropic and unpredictable. The clearing of a particularly hard clinker that is sufficiently large requires a separate procedure. Currently the electric power industry uses a manual clinker clearing operation that is described below.

Once the flushing apparatus is obstructed, the hopper must be drained and the clinkers must be dislodged and broken into small enough pieces which the grinder can handle. This process usually requires the furnace to be shut down completely or to be operated at a reduced output. Once the hopper is drained, workers open an access port at the bottom of the hopper. The most common method of clearing the clinkers is to use a long heavy steel rod with a chisel on its end. A jackhammer is connected to the other end of the rod and the impacts are transmitted through the rod to a chisel at the end of the rod and onto the clinkers. This operation usually involves three to four workers. One worker stands at the top of a ladder or platform, which is at the level of the hopper access port, and positions the chisel. One or two workers support the rod, and another worker operates the jackhammer. The clinker clearing process is extremely dangerous since clinkers can drop from the hopper walls onto the pole as the workers are holding on to the pole. Pieces of molten clinkers can also come out of the open port. The danger is further intensified by the high temperature and poor visibility inside the hopper which is filled with a cloud of smoke and molten ash. The worker who is located on the top of the ladder is required to peer into the port to identify the current clinker location. The original clinker geometry is identified quite accurately by using a sonar mapping system when the hopper bottom is filled with water prior to flushing and opening of the port. The entire operation can take several hours to a day to complete which can spell large financial losses for the power plant Since the environment inside the boiler is a hazardous one, the workers are required to wear cumbersome protective suits and head gear which can get very uncomfortable around the elevated temperatures inside the hopper. They also have to lift the heavy pole with the jackhammer while clearing the clinkers. Therefore, fine positioning of the device during the process is difficult to achieve. During the clearing process, sometimes portions of the hot water inside the furnace can spill out from the port and the workers in the protective suits have to continue the process while they are knee deep in water. Due to the danger involved in the clinker clearing operation and the long period of time required to complete it, a safer and more efficient method is highly desirable. Safety concerns and plant productivity have been the primary driving factors behind the efforts to automate the clinker clearing process. The automation of the clinker clearing process is characterized by the unique environment which exists inside an electric power plant furnace bottom hopper. This environment is hazardous, unpredictable, and cannot be modeled accurately due to poor visibility. These factors render the application of existing robotic devices unsuitable. Commercially available robots either do not possess sufficient force generation capability, or they are too large for the cluttered geometry of the region in and around the hopper. In addition, these devices require actuated joints with associated electronics to be operated inside the furnace. The highly corrosive molten ash of the coal boilers requires the use of minimal moving parts that are inexpensive and easily replaced inside the hopper.

OBJECTS AND SUMMARY OF THE INVENTION

Objects of the present invention are to provide a robotic system for maintenance of boiler hoppers which:

(a) can be tele-operated at a distance from the open port whereby personnel are not exposed to any harmful contents of the boiler;

(b) accesses the hopper via a port and can be used at all the boiler ports of the plant;

(c) is suitable for operation in the high temperature environment of the operating furnace (140° F. to as high as 1200° F. for short periods of time) where sparks and pieces of falling molten clinkers are commonplace;

(d) is capable of breaking up clinker material into sufficiently small pieces with the appropriate tool at its end point;

(e) can 'bend' or 'break away' without causing any damage to the rest of the device;

(f) reaches all the clinker accumulating regions of the hopper;

(g) can be positioned in a suitable orientation and generate sufficient forces to break a clinker into smaller pieces;

(h) includes a camera to provide the best visual feedback possible of the hopper interior to the remote operator;

(i) includes a system for locating the clinkers which integrates the existing sonar mapping system that is quite accurate in the presence of water in the hopper bottom;

(j) allows the operator to distinguish clinker buildup from the structural elements of the hopper;

(i) can be installed safely and operated without much training by operators.

There is provided a robotic system for inserting a pole through an opening in a chamber and for remotely controlling the position of the end of the pole within the chamber. The system includes a support structure for supporting a pole insertion mechanism and a pole positioning mechanism. The pole positioning mechanism serves to rotate the pole about a gimbal in the vertical and horizontal directions, and the pole insertion mechanism serves to move the pole axially, whereby the end of the pole can be positioned at a desired location within the chamber.

The robotic system also includes a control system including a processor for storing sonar data which maps the location of clinkers, a video camera and display which provides visual feedback of the hopper interior, and a pole location and control system for remotely controlling the pole positioning and insertion mechanism to position the end of the pole at clinker locations.

BRIEF DESCRIPTION OF THE DRAWINGS

The foregoing and other objects of the invention will be more clearly understood from the following detailed description when read in conjunction with the accompanying drawings as follows.

FIG. 1 is a schematic drawing of a pole insertion and pole positioning mechanism mounted on a hopper.

FIG. 2 is a schematic drawing of a pole insertion mechanism showing the hydraulic drive cylinders.

FIG. 3 is a drawing of a pole insertion and pole positioning mechanism mounted on an actuator frame by a gimbal with vertical and horizontal drive hydraulic actuators.

FIG. 4 is an enlarged view of a portion of FIG. 3.

FIG. 5 is an exploded view of the pole insertion mechanism.

FIG. 6 is a schematic of a tele-operated pole insertion and positioning robotic system.

FIG. 7 is a schematic diagram of the hydraulic system which drives the hydraulic actuators to position the pole.

FIG. 8 is a pseudo flow chart which depicts the interaction between the different components of the clinker clearer robotic mechanism.

DETAILED DESCRIPTION OF THE INVENTION

The robotic mechanism of the present invention is preferably adapted to be moved to and used to clear clinkers from hoppers in a number of furnaces. To that end, the robotic mechanism is capable of being detachably secured to the hopper structure. Referring to FIGS. 1 and 3, the robotic mechanism includes a mating frame 11 which is detachably secured to a hopper 12 with docking clamps 13, which are the only required modification to the hopper design. The mating frame carries an actuator frame 14 which in turn carries the rod or pole actuators including a pole insertion mechanism 16 and a pole rotating mechanism 17, 18 whereby the pole can be axially moved and rotated about a gimbal 19 in a horizontal and vertical direction. The actuator frame has the ability to swing about a vertical hinge 21 with respect to the mating frame. The degree of freedom allows the robot to move out of the way of the hopper port 22.

The clinker clearing process involves the following steps:

(a) Transporting or the frame to the particular hopper 12 that needs to be cleaned;

(b) Mounting the frame onto the hopper docking clamps 13;

(c) Opening the sluice gate to grind and flush as many of the clinkers in water as possible, then closing the sluice gate so that the port 22 can be safely opened;

(d) Swinging the actuator frame about the vertical hinge and opening the port door 23, FIG. 1;

(e) Closing the actuator frame and attaching it to the mating frame, inserting a pole 24 partially into the robotic mechanism;

(f) Moving the operators or personnel safely away from the port;

(g) Opening the sluice gate and inserting the pole into the hopper to break clinkers;

(h) Removing the pole partially and shutting down the sluice gate;

(i) Removing the pole, swinging the actuator frame and closing the port door 23;

(j) Opening the sluice gate, followed by grinding and flushing of the broken clinkers.

Since the environment inside the hopper is extreme, the components that enter the hopper as part of the design of the robot need to be simple and inexpensive. The study of the manual clinker clearing process indicated that it would be possible to perform this process successfully by merely inserting a pole 24 through the port 22. The robotic mechanism permits the operators to insert and extract the pole, move the pole axially, and rotate the pole about the vertical direction to position the end of the pole.

Referring particularly to FIGS. 1, 3 and 4, the pole insertion mechanism 16 is carried by a gimbal 19 supported by the actuator frame 14. The gimbal 19 can be rotated in a vertical direction about the pins 26 and 27 which secure the outer ring 28 to the frame and in a horizontal direction about the pins 31 and 32 which secure the inner ring 29 to the outer ring 28. A hydraulic actuator 18 mounted between the frame 14 and the pole insertion mechanism swings the insertion mechanism in a horizontal direction, and a hydraulic actuator 17 secured to the frame 14 moves the insertion mechanism in a vertical direction. This provides for rotation of the pole in a vertical and horizontal direction about the gimbal. The pole support and insertion mechanism is supported from the inner gimbal ring 29 by spaced support rods 33 which are secured to an attachment 34 to the ring 19 and extend between the attachment 34 and plate 35. Rods 36 extend between the plate 35 and frame 49, and rods 37 extend between frame 49 and plate 38. The rods 33 support the pole insertion mechanism 16 which provides the pole insertion and extraction capability. The prismatic or axial degree of freedom is implemented using a clamp and pull mechanism. A schematic of the pole insertion mechanism is shown in FIG. 2, and a detailed exploded view in FIG. 5. The pole insertion mechanism consists of a set of six identical hydraulic actuators 41, 42 and 43 and 46, 47 and 48 arranged in two sets of three such that each set is connected to the frame 49 of the pole insertion mechanism on one end, and to end plates 51, 52 at the other end. The end plates 51 and 52 support clamping mechanisms 53 and 54, respectively, which are actuated by hydraulic actuator 56, 57, respectively. The end plates 51, 52 are guided for movement by rollers 58, 59 which engage the rods 36, 37 respectively, FIGS. 3 and 4, which support the frame 49. The three hydraulic actuators on each end are placed symmetrically about the pole axis such that in a nominal position the planes formed by the actuator axis with the pole axis make an angle of 120° relative to one another. This symmetry and parallel actuation allows development of large pulling forces that the actuators can impart to the pole in a situation where the pole needs to be pulled out from underneath a heap of clinker material. The pole 24 is guided by rollers 61 which are supported by plate 35. Identical rollers, not shown, are supported by the plate 38.

The sequence of operations required to move the pole to the left as viewed in schematic FIG. 2 is described below for one possible sequence. (A similar sequence can be generated to move the pole to the right.)

1. Locate the three actuators 41, 42 and 43 on the left in their extreme right position with the two clamps 53, 54 open.

2. Insert the pole through the plates 51, 52, through the guide rollers 61 and gimbal 19, and clamp onto the pole at the left end with clamp 53.

3. Extend three hydraulic actuators 41, 42, 43 on the left to their left extreme position.

4. Locate the three actuators 46, 47, 48 on the right in their right extreme position, clamp onto the pole at the right with clamp 54, and then unclamp the clamp 53.

5. Move the three actuators 46, 47, 48 to the extreme left position, and the left three actuators 41, 42, 43 to their extreme right position, then clamp onto the pole on the right followed by unclamping of the pole on the left.

6. Return to step 3 until the desired prismatic motion is achieved.

It is understood that other sequences of operation can be adopted. For example, both sets of hydraulic actuators can be used to push or pull the pole.

The travel of the six actuators can be adjusted so as to provide large incremental travel during course positioning and small incremental travel during fine positioning. Thus there is provided a pole insertion and control mechanism in which hydraulic actuators provide for positioning of the pole within the furnace hopper.

In the event that the pole gets buried under a pile of ash and clinkers, and/or it gets bent due to such loads, the pole insertion mechanism should be able to extract the pole from underneath the pile and/or unbend the pole as it extracts it. This operation requires large load generating capacity. The clamps have to generate large clamping forces in order to avoid slipping of the pole. While gross slipping of the pole is dangerous, small amounts of slipping can lead to inaccurate estimates for the location of the end point of the pole.

As explained earlier, the pole is treated as an end-effector module that can be readily replaced by another pole of different length or can be replaced if it gets damaged significantly during the operation. While these poles can be commercially available ones that are inexpensive, a nominal amount of modification is required before these poles can be used for clinker clearing operations. The function of breaking the clinkers is achieved by attaching a commercially available air chisel at the end of the pole. The hollow interior of the pole is used to deliver compressed air to the chisel. In order to detect the end point of the pole making contact with a clinker and to monitor the progress of the chisel, an accelerometer can be mounted near the end of the pole. The cables connecting the accelerometer to the control station will be enclosed inside the hollow pole. At the outer end of the pole, a sealed outlet allows the cables to emerge from the duct that carries the compressed air. Two pole lengths are sufficient to be able to reach most of the bottom hopper structure of FIG. 1.

Feedback must be provided to the operator as to where the pole is located relative to the static geometry of the hopper and to the dynamic geometry of the clinkers. This requires computing the gimbal angle which involves the computation of the cylinder length of the actuators 17 and 18 for given values of horizontal and vertical angular deflection. This information is required for control purposes because, given the desired orientation of the pole, it must be related to the gimbal angle and the cylinder length. The accuracy of the location can be on the order of a few inches if twenty-five discrete values of cylinder lengths as related to position are provided in a look-up table. This gives 625 sets of solutions for the gimbal angle which provides adequate accuracy for the location of the rod end.

Referring to FIG. 6, a robotic mechanism and control system is schematically illustrated. The system includes the pole insertion mechanism 16 with its six hydraulic actuators and the gimbal 19 and two hydraulic actuators 17 and 18. Hydraulic feed and return lines 62 provide hydraulic fluid to the actuators. The hydraulic fluid flow is controlled by an electrically controlled valve assembly schematically shown at 63. Potentiometers (not shown) provide signals representing the position of the actuators to a processor 64. The processor in turn translates the signals to a visual display 66 which shows the rod position. The processor 64 also includes data representing the hopper configuration whereby the display can show the location of the rod with respect to the hopper walls. A video camera 67, FIGS. 3 and 4, is provided and moves with the gimballed pole. The camera provides a visual display of the interior of the hopper to the remote operator. However, the view may be impaired because of the presence of smoke, debris and the like within the hopper and may not show the location of the rod under these conditions. If a sonar representation of the clinker locations within the hopper is available, it is also input into the processor. The display can then show not only the hopper walls, but also the location of the clinkers on the walls, and the location of the pole with respect to the clinkers. If a video representation is available, the operator can also visually see the location of the pole with respect to clinkers and hopper walls. The operator can manipulate a joy stick 71 to control the valve assembly 63 and bring the chisel end of the pole into contact with the clinkers to dislodge them from the hopper walls.

FIG. 7 is a schematic diagram of the electrically controlled valve assembly 63. The assembly includes solenoid valves 76 and 77 which control application of hydraulic fluid to the hydraulic actuators 41, 42, 43 and 46, 47, 48, respectively, via the pairs of hydraulic lines 78, 79 and 81, 82. Solenoid valves 83 and 84 control the application of hydraulic fluid to the hydraulic clamp actuators 56, 57. Servo valves 86, 87 control the application of hydraulic fluid to the vertical and horizontal actuators 17, 18, hydraulic pump 88 provides the hydraulic fluid under pressure. The pressure is controlled by pressure control valve 89.

The following description, together with the flow chart of FIG. 8, amplifies the brief description of the operation of the tele-operated robot provided with respect to FIG. 6. The robotic mechanism is remotely controlled from a control system which includes all of the essential control software and hardware.

The processor 64 in conjunction with the data acquisition board 91 and the frame grabber 92 receives the following types of data: an analog accelerometer signal 93, sonar imaging data, CCD camera video input 94, hydraulic cylinder potentiometer voltage 96, joystick analog signal 97, and operator input 94. The accelerometer signal is analyzed through software to detect collisions between the jackhammer at the end of the pole and, a clinker. The sonar imaging data is used to create a model of the clinkers' locations, sizes, and orientations which are then incorporated into the graphical model 98 of the hopper structure. The video input is fed through the frame grabber and displayed on the computer monitor 66. The operator orients the insertion mechanism such that the two laser beams generated by lasers (not shown) mounted on either side of the camera are shining on the target clinker. The operator then uses the mouse to tell the computer where the two laser beams are in the frame grabber's digitized image. From this information, the control software can calculate the distance to the clinker and compare it with the sonar data The hydraulic cylinder potentiometer tells the control software the position of the cylinder's piston with respect to its fully retracted position. This information is fed into the processor as a voltage and the software calculates the corresponding position from that voltage. Potentiometers are mounted on the two main cylinders in order to calculate the orientation of the gimbal. Potentiometers are mounted on the two main cylinders in order to calculate the orientation of the gimbal. Potentiometers are also mounted on two out of the six cylinders (one in each direction) which move the pole along its axis in order to calculate how far the pole has been inserted. The joystick tells the control software what the desired position of the insertion mechanism is. The input is analyzed by the control software and the software then feeds the corrected signal to the servo amplifiers. In addition, the joystick has four buttons which perform the following functions:

1. One button tells the software that the operator is ready to begin and instructs the clamps' solenoid valves to clamp the pole.

2. A second button gives the software instructions to insert the pole.

3. A third button gives the software instructions to extract the pole.

4. Finally the last button triggers the air hammer and instructs the control software to keep the main cylinders in a fixed position.

The servo amplifiers are used to control the servo valves which provide the hydraulics for the two main cylinders (vertical and horizontal). The servo amplifiers receive a joystick command from the control software and they also receive the potentiometer signals from the main cylinders. For each servo amplifier, the joystick signal and the potentiometer feedback are compared using the servo amplifier's built-in PID (proportional-integral-derivative) controller. The PID controller calculates the difference between the joystick command and the actual position of the cylinder and compensates for the error to achieve the desired position.

The design of the novel robotic mechanism that includes an attachment frame and a pole inserting robot for clearing clinkers from the bottom of boiler hoppers has been described. The design is such that it consists of all the expensive components of the device being located outside the harsh environment of the hopper. Only an inexpensive pole module enters the hopper through a port. The insertion and control of the pole inside the hopper is achieved by the unique insertion mechanism in connection with the actuated gimbal mechanism. The concept of inserting poles into the hopper also allows flexibility to use poles of various lengths that can be used to enhance the reach of the device within the hopper.

What is claimed:

1. A robotic mechanism for inserting and positioning the end of a pole within a hopper of a furnace comprising:

a frame assembly adapted to be secured to the furnace hopper, a pole insertion mechanism for receiving, guiding and axially moving said pole, a gimbal for mounting said pole insertion mechanism on said frame assembly, and actuators for rotating said pole insertion mechanism horizontally and vertically about said gimbal.

2. A robotic mechanism as in claim 1 in which said actuators comprise hydraulic actuators mounted between said frame assembly and said pole insertion mechanism.

3. A robotic mechanism as in claim 2 in which said pole insertion mechanism comprises a clamp and move assembly.

4. A robotic mechanism as in claim 3 in which said clamp and move assembly includes spaced plates including clamping means for selectively clamping the pole to the plates and hydraulic actuators for selectively moving the plates whereby the pole is axially driven by selectively clamping and moving said plates.

5. A robotic mechanism as in claim 3 including valve means for controlling the application of hydraulic fluid to said hydraulic actuators, responsive to control signals, so as to position the end of the pole at a selected location.

6. A robotic mechanism as in claim 5 in which said control signals are generated by a processor in response to operator generated control signals.

7. A robotic mechanism as in claim 6 including means for providing to an operator a visual display of the pole location within the hopper interior to enable the operator to generate the control signals.

8. A robotic mechanism for inserting and positioning the end of a pole within a hopper of a furnace comprising:

a frame assembly including a mating frame for attaching the frame assembly to the furnace hopper and an actuator frame hingedly secured to said mating frame, a pole insertion mechanism for receiving, guiding and axially moving said pole, a gimbal for mounting said pole insertion mechanism on said actuator frame, and actuators for rotating said pole insertion mechanism horizontally and vertically about said gimbal.

9. A robotic mechanism as in claim 8 in which said actuators comprise hydraulic actuators mounted between said frame assembly and said pole insertion mechanism.

10. A robotic mechanism as in claim 9 in which said pole insertion mechanism includes spaced plates including clamping means for selectively clamping the plates to the pole and hydraulic actuators for selectively moving the plates whereby the pole is axially driven by selectively clamping and moving the plates.

11. A robotic mechanism for inserting and positioning the end of a pole within a hopper of a furnace comprising:

an expendable pole, a frame assembly adapted to be positioned in operative relationship with the exterior of the furnace, a pole insertion mechanism for receiving, guiding and axially moving said expendable pole, a gimbal for mounting said pole insertion mechanism on said frame assembly external of said furnace, and actuators external of said furnace for rotating said expendable pole insertion mechanism horizontally and vertically about said gimbal.

12. A robotic mechanism as in claim 11 in which said actuators comprise hydraulic actuators mounted between said frame and said pole insertion mechanism.

13. A robotic mechanism as in claim 12 in which said pole insertion mechanism includes spaced plates including clamping means for selectively clamping the plates to the pole and hydraulic actuators for selectively moving the plates whereby the pole is axially driven by selectively clamping and moving the plates.

14. A robotic mechanism as in claims 11, 12 or 13 including a control system for controlling said pole insertion mechanism and said actuators.

* * * * *